United States Patent Office 3,288,725
Patented Nov. 29, 1966

3,288,725
CATALYSTS FOR HYDROGENATION
Victor D. Aftandilian, Watertown, Mass., assignor to Cabot Corporation, Boston, Mass., a corporation of Delaware
No Drawing. Filed Oct. 25, 1963, Ser. No. 318,809
17 Claims. (Cl. 252—447)

The present invention relates to processes for hydrogenation and more specifically to novel hydrogenation catalysts.

Catalytic hydrogenation processes comprise a valuable and well known segment of the chemical art. Generally, such processes are accomplished by treating the compound to be hydrogenated with hydrogen gas under pressure and in the presence of a catalyst comprising a zerovalent transition metal deposited upon an inert particulate solid. Catalysts of the aforementioned type are generally produced by (a) deposition from solution of a suitable transition metal compound onto the surface of a particulate inert solid and (b) subsequent activation of the resulting catalyst intermediate by reduction of the deposited transition metal to a zero-valent state. A serious disadvantage which often occurs in catalyst preparation methods of the above type and which often results in deleterious effects upon the ultimate activity and uniformity of the catalyst lies in the fact that uniform deposition of the transition metal compound on the surface of the inert particulate solid is normally accomplished only with great difficulty. Thus, it often occurs that when said catalyst intermediate is activated (i.e. the transition metal is reduced to zero-valent state) the inert solids do not bear on the surface thereof a homogeneous deposit of the transition metal. Consequently, it is often further found that the maximum potential catalytic activity of the catalyst (i.e. the rate of conversion per total amount of transition metal) is not achieved because many of the transition metal atoms (a) are insufficiently exposed during activation of the catalyst intermediate and are therefore not completely reduced, and (b) are masked and are thus prevented from effectively coming into contact with the substance to be hydrogenated.

In accordance with the present invention, however, this problem has been largely solved.

It is a principal object of the present invention to provide hydrogenation catalyst intermediates of vastly increased uniformity.

It is another object of the present invention to provide a novel process for the production of hydrogenation catalyst intermediates possessing extraordinary uniformity.

It is still another object of the present invention to provide improved hydrogenation catalysts.

It is still another object of the present invention to provide an improved hydrogenation process.

Other objects of the present invention will in part be obvious and will in part appear hereinafter.

In accordance with the present invention, it has been discovered that improved hydrogenation catalyst intermediates are produced by reacting hydroxyl groups on the surface of a finely-divided inorganic solid and certain organometallic compounds of Group VIII metals.

Inorganic solids suitable for the purposes of the present invention generally include any inorganic solid which is available in particulate form with hydroxyl groups on the surface thereof. For example, metal oxides such as alumina, zirconia, silica, thoria and magnesia, silicates such as chrysotile, actinolite, and crocidolite, aluminates such as corundum and bauxite and carbon blacks such as channel black are all generally suitable for the purposes of the present invention. It should be noted, however, that the ultimate efficiency of the catalyst intermediates and the hydrogenation catalysts produced therefrom in accordance with the present invention is generally highly dependent upon the number of surface hydroxyl groups present per gram of finely-divided inorganic solid. Accordingly, in preparing the catalyst intermediates of the present invention, it should be borne in mind that generally the larger the quantity of hydroxyl groups on the surface thereof, the greater will be the potential activity and efficiency of the catalyst intermediates and catalysts producible therefrom. Therefore, it is important to use as starting material, particulate solids having an average particle diameter of less than about 0.1, and preferably less than 0.05, microns and having a hydroxyl group concentration on the surface thereof of at least above about $1 \times 10^{-4}$, and preferably at least about $5 \times 10^{-4}$ equivalents per gram. Use of particulate inorganic solids having a hydroxyl group content of less than about $1 \times 10^{-4}$ equivalents per gram generally results in catalysts having an extremely low activity per gram while particulate solids having a surface hydroxyl group content of greater than about $4 \times 10^{-3}$ equivalents per gram are not normally available.

Organometallic compounds of Group VIII (Mendeleev Periodic Table) metals suitable for the purposes of the present invention are the compounds conforming to the empirical formula $$MX_aP_b$$

wherein M is a metal of Group VIII such as nickel, iron, palladium, platinum and ruthenium; each X is any halogen; $a$ is a number from 1 to 2; each P is any unsaturated hydrocarbon group which is $\pi$-bonded to M; and $b$ is a number from 1 to 2.

Specific examples of suitable P groups are: cyclopentadiene—$C_5H_6$; benzene—$C_6H_6$; 1,5 - cyclooctadiene—$C_8H_{12}$; 1,3-butadiene—$C_4H_6$; ethylene—$C_2H_4$; propene—$C_3H_6$; 1,4 - cyclohexadiene—$C_6H_8$; cyclohexene—$C_6H_{10}$; durene—$C_{10}H_{14}$; and the like.

Specific examples of suitable organometallic compounds conforming to the above empirical formula are diethylene platinum dichloride; 1,5-cyclooctadiene platinum dichloride; 1,3-butadiene platinum dibromide; ethylene iridium dichloride; dicyclopentadienyl rhodium bromide; dicyclopentadienyl cobalt chloride; dimer of diethylene palladium dibromide; 1,5-cyclooctadiene osmium dichloride; and the like.

The following equations, wherein silica represents the particulate inorganic solid having hydroxyl groups on the surface thereof and 1,3-butadiene platinum dichloride represents the organometallic compound, are believed to correctly illustrate the reactions that occur when a transition metal organometallic compound is reacted with hydroxyl group(s) on the surface of an inorganic solid:

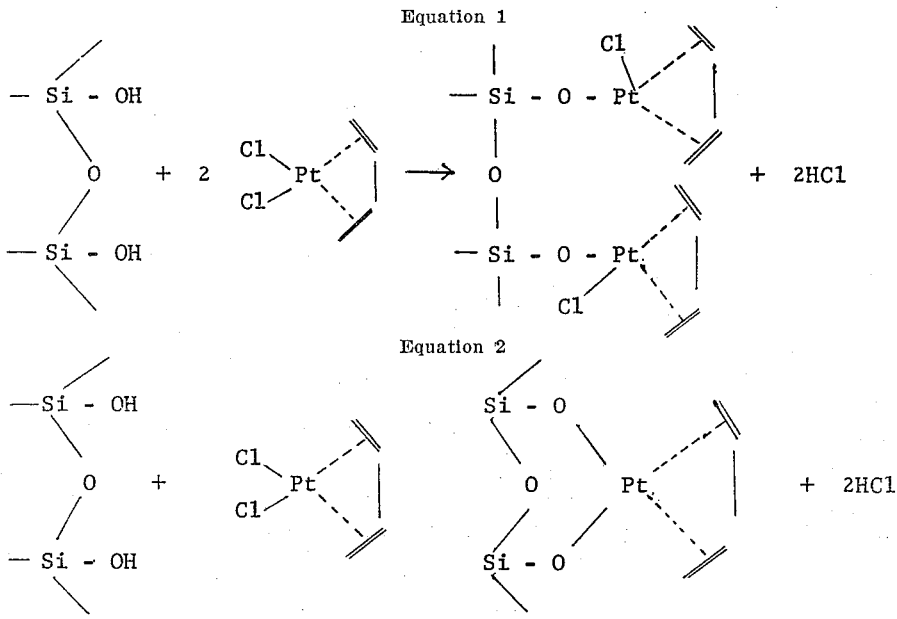

The conditions under which reaction between the organometallic compound and hydroxyl groups on the surface of the particulate inorganic solid can be accomplished are subject to considerable variation. However, in order to obtain a catalyst intermediate with exceptionally high activity and reproducible character and performance it has been found to be generally necessary that said inorganic solid be essentially dry and anhydrous (i.e, free of molecular water in any form) at the time it is brought into contact with the organometallic compound.

In addition, it is recommended that the reaction of hydroxyl groups on the surface of the inorganic solid and the organometallic compound be accomplished so as to allow gaseous by-products of the reaction to be eliminated from the reaction zone in order to thereby cause said reaction to move towards completion. Generally, the said reaction can be carried out by contacting said inorganic solid with said organometallic compound and maintaining the two reactants in intimate contact for a period of time sufficient to effect the desired chemical reaction resulting in the chemical bonding of the organometallic compound to the inorganic solid. The reaction can be effected in an inert hydrocarbon medium although in order that activation of the resulting catalyst intermediate take place it is often necessary that said liquid media be substantially completely removed prior to the activation procedures. Also, the reaction can be carried out by exposing the inorganic solid to vapors of the organometallic compound, provided, of course, that said solid is exposed to sufficient quantities of vapors of said compound and under conditions of time and temperature that will foster reaction. Said vapors can be supplied under their own vapor pressures using partial vacuum if necessary, or with the aid of a dry, inert carrier gas such as dry nitrogen or helium. This vapor phase treatment can be accomplished in any suitable manner such as by circulating the vapors through the particulate solid in a fluid bed reactor.

Generally speaking, temperatures between about 0° C. and about 150° C. and even higher temperatures can be used satisfactorily, but the range from about 25° C. to about 125° C. is generally preferred for the reaction between the organometallic compound and surface hydroxyl groups. Temperatures substantially higher than about 125° C., e.g. 165° C. are generally completely needless and therefore of little or no interest and moreover, often cause decomposition of the organometallic compound.

Several classes of hydrocarbons or their mixtures which are liquid and substantially inert under the conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also members of the aromatic hydrocarbon series, such as isopropyl benzene, ethyltoluene, hemimellitene, pseudocumene, isodurene, isoamylbenzene, and particularly the mononuclear aromatic hydrocarbons such as xylenes, mesitylene and xylene-p-cymene mixtures, and the like are completely suitable. It should once again be noted, however, that, as is the case with the particulate inorganic solids of the present invention, dryness of the liquid hydrocarbon medium is essential for efficient promotion of the reaction between hydroxyl groups on the surface of the inorganic solid and the organometallic compounds. It has been found to be most convenient (in those cases wherein a liquid hydrocarbon medium is to be utilized) to dry the inorganic solid and the hydrocarbon medium simultaneously as a slurry by azetotropic distillation prior to contacting said mixture with the organometallic compound.

It is also pointed out that the quantity of organometallic compound reacted with a given quantity of inorganic solid should preferably be stoichiometrically sufficient to react with all the hydroxyl groups on the surface of the solid. Normally, an excess of organometallic compound is undesirable as the excess may deposit nonuniformly on the surface of the solid. On the other hand, the use of less than said quantity produces a catalyst intermediate which does not possess optimum efficiency and moreover, the hydroxyl groups left unreacted on the surface thereof, may adversely affect the performance of the catalyst subsequently produced.

Suitable methods for the activation of the catalyst intermediates of the present invention are subject to considerable variation. One method by which activation can generally be accomplished comprises contacting said catalyst intermediate with hydrogen at temperatures above about 200° C. and preferably above about 300° C. for a sufficient period of time. However, activation can also be effected by contacting the catalyst intermediates of the present invention, with a solution of an alkali metal borohydride such as sodium borohydride or potassium borohydride at about room temperatures. Room temperatures have been found to be generally sufficient although higher temperatures can be utilized.

Among the liquid media suitable for solution of the alkali metal borohydride are the alkyl ethers of ethylene glycols. Specific examples of suitable liquid media are: triethylene glycol dimethyl ether, diethylene glycol dimethyl ether, ethylene glycol dimethyl ether, diethylene glycol diethyl ether, ethylene glycol dibutyl ether, and the like.

Using the catalysts of this invention, hydrogenation can be accomplished either by a gas-solid or liquid-solid process. Since, to a large extent, the success of the hydrogenation process depends upon contact between the substance to be hydrogenated and the catalyst, it is at once obvious that solid phase hydrogenation is normally impractical. Thus, when a solid (at the hydrogenation conditions) is to be hydrogenated, it is preferred that said substance be first dissolved in an inert solvent. Any of the several classes of hydrocarbons or their mixtures heretofore mentioned which are liquid and substantially inert under the hydrogenation conditions of the present process constitute suitable solvents. Thus, in general, saturated hydrocarbons are to be preferred.

It should be noted that hydrogen must be supplied to the hydrogenation zone in order that the hydrogenation process be rendered substantially continuous in nature. Generally, it is sufficient that said hydrogen be supplied at pressures of between about 1 and about 5 atmospheres, although higher pressures can, of course, be utilized.

The conditions of temperature and pressure, flow rates, etc. required in the hydrogenation of a particular compound vary to a large extent depending upon the particular transition metal utilized in the catalyst, the substance to be hydrogenated and the geometry of the apparatus in which the hydrogenation is to be accomplished. Such requirements can be readily determined for any particular set of conditions.

There follow a number of illustrative non-limiting examples:

*Example 1*

To a 2000 milliliter, three neck glass reaction flask there is charged 20 grams of Supercarbovar, a channel carbon black produced by Cabot Corporation, having an average particle diameter of about 14 millimicrons and a hydroxyl group content on the surface thereof of about 1.6 milliequivalents per gram. To said reaction vessel there is added 1700 milliliters of isooctane and the resulting slurry is dried by being heated to, and maintained at, the boiling point of isooctane i.e. about 116° C., for about 20 hours, while a water/isooctane azeotrope is removed from the reaction vessel by periodic distillation until about 450 milliliters of distillate has been removed. The vessel is then cooled and charged with 20 millimoles of 1,5-cyclooctadiene platinum dichloride. The resulting slurry is then refluxed for about 6 hours with continuous stirring and nitrogen sweep of the reaction zone. Subsequently, the extent of the reaction between the 1,5-cyclooctadiene platinum dichloride and hydroxyl groups on the surface of the carbon black is determined by measuring the quantity of HCl that was produced and by testing the liquid contents of the vessel for the absence therein of 1,5-cyclooctadiene platinum dichloride, and said slurry is found to contain 20 milliatoms of platinum chemically bound to the surface of said carbon black. Without exposure to air, the entire slurry, is then filtered through a Buchner funnel and the resulting filter cake is subsequently washed with diethylether. The filter cake is then crumbled and dried in a vacuum oven (60° C.) for about 24 hours. Next, one-half of said filter cake comprising about 10 grams of carbon black having chemically bound to the surface thereof about 10 milliatoms of platinum is mechanically attrited and then charged to a 1000 milliliter stainless steel reaction bomb. The bomb is then evacuated, heated to, and thereafter maintained at, about 300° C. Said bomb is then pressurized to about 30 p.s.i.g. with hydrogen, sealed and agitated for about 3 hours, thereafter being cooled to 25° C. Next, 200 millimoles of cyclohexene is charged to said bomb and the 30 p.s.i.g. hydrogen pressure is thereafter maintained by the periodic addition of further amounts of hydrogen for about 30 minutes. Subsequently, the remaining pressure in the bomb is vented to atmosphere. The liquid contents are analyzed and it is found that about 180 millimoles of cyclohexane have been produced.

When, hydrogenation of cyclohexene is attempted under the above conditions utilizing hydrogen alone (i.e. without the solid carbon black/platinum catalyst of the present invention) little or no cyclohexane is produced.

*Example 2*

The remaining half of the catalyst-intermediate produced in Example 1, comprising about 10 grams of carbon black having chemically bound to the surface thereof about 10 milliatoms of platinum is dispersed in 150 milliliters of ethylene glycol dimethyl ether and the resulting slurry is then introduced into a 500 milliliter glass pressure vessel. Next, a solution comprising 100 millimoles of cetyl trimethylammonium borohydride is added dropwise to the pressure vessel and the resulting slurry is agitated continuously at ambient temperature for about 30 minutes. Next, there is charged to said vessel about 200 millimoles of p-nitrotoluene and said vessel is continuously stirred while hydrogen is provided to the reaction zone by means of a bubbler positioned beneath the liquid surface. After about 20 minutes, the hydrogen supply is arrested and the vessel is flushed with dry nitrogen. The reaction products are analyzed and it is found that p-toluidene has been produced.

*Example 3*

To a fluidized bed column equipped with a heating mantle there is charged 40 grams of "Cab-O-Sil," a pyrogenic silica produced by Cabot Corporation, having an average particle diameter of about 10 millimicrons and a surface hydroxyl group content of about 1.5 milliequivalents per gram. Next, said column is heated to and maintained at about 140° C. and the silica is dried by passing dry nitrogen preheated to about 140° C. therethrough for about 3 hours at a rate sufficient to gently fluidize the silica. A 100 milliliter glass side arm flask equipped with a heating jacket is then positioned in such a manner as to allow gases introduced through the side arm to sweep the contents of said flask and thereafter pass into the fluid bed. Forty millimoles of dicyclopentadienyl nickel chloride is introduced into the flask and the flask is heated to and maintained at about 100° C. while dry nitrogen, preheated to about 100° C. is introduced through the side arm at a rate sufficient to fluidize the silica bed. After one hour, the nitrogen flow is diverted so as to flow into the silica bed without first passing through said flask and said silica is so flushed for about 3 hours in order to remove any unreacted dicyclopentadienyl nickel chloride and to remove any hydrogen chloride formed. The nitrogen flow is then arrested and the column allowed to cool to ambient temperature. The extent of reaction between hydroxyl groups on the surface of the silica and the dicyclopentadienyl nickel chloride is determined by measuring the amount of HCl produced and by testing the contents of the side arm flask for the presence therein of dicyclopentadienyl nickel chloride and the silica is found to have chemically bound to the surface thereof about 40 milliatoms of nickel.

Twenty grams of the nickelated silica are then transferred to a one gallon stainless steel stirred autoclave. Said autoclave is then evacuated and pressurized to about 50 p.s.i.g. with hydrogen and thereafter heated to and maintained at about 300° C. for about 30 minutes with continuous stirring after which said autoclave is cooled and maintained at about 25° C. Hydrogenation of linoleic acid is accomplished by charging a solution comprising 1500 milliliters of purified linoleic acid and 1000 milliliters of n-hexane into the autoclave while a hydrogen pressure of about 50 p.s.i.g. is maintained therein by the periodic introduction of hydrogen. After about one hour the reaction is discontinued. Examination and analysis of the contents of the autoclave reveals that stearic acid has been produced.

Obviously, many changes can be made in the above examples and description without departing from the scope of the present invention. For example, the catalyst intermediates of the present invention can be produced by contacting said organometallic compounds, under conditions similar to those hereinbefore discussed, with a particulate inorganic solid which has been treated in such a manner as to replace hydrogen atoms of hydroxyl groups with Group I alkali metal atoms, as disclosed in copending U.S. application 300,049, filed August 5, 1963, now abandoned, by Yancey and MacKenzie wherein ion exchange materials are produced by reacting surface hydroxyl groups on the surface of a finely-divided inorganic solid with Group I alkali metals or alkali metal compounds conforming to the formula

MR wherein M is an alkali metal and R is chosen from the group consisting of hydrogen and monovalent hydrocarbon radicals.

What I claim is:

1. A catalyst intermediate which comprises a finely-divided inorganic solid having an average particle diameter of less than about 0.1 micron and carrying in chemical combination at least about $1 \times 10^{-4}$ equivalents per gram of surface structures chosen from the group consisting of

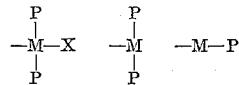

wherein M is a metal of Group VIII; X is any halogen; each P is any hydrocarbon group having at least one unsaturated carbon to carbon bond and which is π-bonded to M; and wherein M is chemically linked to at least one oxygen atom on the surface of said solid.

2. The catalyst intermediate of claim 1 wherein said surface structures comprise:

3. The catalyst intermediate of claim 1 wherein said surface structures comprise

4. The catalyst intermediate of claim 1 wherein said surface structures comprise

M—P

5. A process for producing a catalyst intermediate which comprises reacting hydroxyl groups on the surface of a finely-divided inorganic solid having an average particle diameter of less than about 0.1 micron and having a hydroxyl group concentration on the surface thereof of at least about $1 \times 10^{-4}$ equivalents per gram with a compound conforming to the formula:

$MX_aP_b$ wherein M is a metal of Group VIII; each X is any halogen; $a$ is a number from 1 to 2; each P is any hydrocarbon group having at least one unsaturated carbon to carbon bond and which is π-bonded to M; and wherein $b$ is a number from 1 to 2.

6. The process of claim 5 wherein said finely-divided inorganic solid is chosen from the group consisting of silica and carbon black.

7. The process of claim 5 wherein in the formula $MX_aP_b$

M is a metal chosen from the group consisting of platinum, palladium and nickel and $a$ is 1–2.

8. A process for producing a hydrogenation catalyst which comprises activating by reduction the solid product of reaction produced by reacting (a) a finely-divided inorganic solid having an average particle diameter of less than about 0.1 micron and having a surface hydroxyl group concentration of at least about $1 \times 10^{-4}$ equivalents per gram of solid and (b) a compound conforming to the formula $MX_aP_b$ wherein M is a metal of Group VIII; each X is any halogen; $a$ is a number from 1 to 2; each P is any hydrocarbon group having at least one unsaturated carbon to carbon bond and which is π-bonded to M; and wherein $b$ is a number from 1 to 2, by reducing the Group VIII metal to zero valency.

9. The process of claim 8 wherein said reduction is accomplished with an alkali metal borohydride.

10. The process of claim 9 wherein said reduction is accomplished with potassium borohydride.

11. The process of claim 9 wherein said reduction is accomplished with sodium borohydride.

12. The process of claim 8 wherein said reduction is accomplished with hydrogen at temperatures above about 200° C.

13. The process of claim 8 wherein the surface hydroxyl group concentration on said inorganic solid is between about $5 \times 10^{-4}$ and $2.5 \times 10^{-3}$ equivalents per gram.

14. The catalyst intermediate of claim 1 wherein between about $5 \times 10^{-4}$ and about $2.5 \times 10^{-3}$ equivalents per gram of said surface structures are chemically combined to said solid.

15. The catalyst intermediate of claim 1 wherein M in said surface structures is chosen from the group consisting of nickel, palladium and platinum.

16. The catalyst intermediate of claim 1 wherein M in said surface structures is nickel.

17. The catalyst intermediate of claim 1 wherein M in said surface structures is platinum.

References Cited by the Examiner
UNITED STATES PATENTS

| | | | |
|---|---|---|---|
| 2,600,379 | 6/1952 | Doumani et al. | 252—446 |
| 2,717,889 | 9/1955 | Feller et al. | 252—447 X |
| 2,861,960 | 11/1958 | De Boer et al. | 252—460 X |
| 2,980,662 | 4/1961 | Jezl | 260—93.7 |
| 3,123,571 | 3/1964 | Walker et al. | 252—431 X |
| 3,166,541 | 1/1965 | Orzechowski et al. | 260—93.7 |

OSCAR R. VERTIZ, *Primary Examiner.*

BENJAMIN HENKIN, *Examiner.*

H. S. MILLER, A. GREIF, *Assistant Examiners.*